United States Patent
Gaertner et al.

(10) Patent No.: US 9,574,595 B2
(45) Date of Patent: Feb. 21, 2017

(54) BLIND RIVET ARRANGEMENT

(71) Applicant: GESIPA BLINDNIETTECHNIK GMBH, Moerfelden-Walldorf (DE)

(72) Inventors: Richard Gaertner, Moerfelden-Walldorf (DE); Thomas Bamberger, Moerfelden-Walldorf (DE); Berkant Toraman, Moerfelden-Walldorf (DE)

(73) Assignee: GESIPA BLINDNIETTECHNIK GMBH, Moerfelden-Walldorf (DE)

(*) Notice: Subject to any disclaimer, the term of this patent is extended or adjusted under 35 U.S.C. 154(b) by 9 days.

(21) Appl. No.: 14/437,262

(22) PCT Filed: Jul. 5, 2013

(86) PCT No.: PCT/EP2013/064283
§ 371 (c)(1),
(2) Date: Apr. 21, 2015

(87) PCT Pub. No.: WO2015/000532
PCT Pub. Date: Jan. 8, 2015

(65) Prior Publication Data
US 2015/0285288 A1 Oct. 8, 2015

(51) Int. Cl.
*F16B 13/04* (2006.01)
*F16B 19/10* (2006.01)
*B21J 15/34* (2006.01)

(52) U.S. Cl.
CPC ............ *F16B 19/1036* (2013.01); *B21J 15/34* (2013.01); *F16B 19/1045* (2013.01)

(58) Field of Classification Search
CPC ..... F16B 19/1036; F16B 19/1045; B21J 15/34
USPC .............................. 411/34, 500, 501
See application file for complete search history.

(56) References Cited

U.S. PATENT DOCUMENTS

| | | | |
|---|---|---|---|
| 2,706,039 A | 4/1955 | Stanley | |
| 2,930,503 A | 3/1960 | Fred et al. | |
| 3,892,120 A * | 7/1975 | Sheffield | B21J 15/34 72/391.6 |
| 4,338,714 A | 7/1982 | Powderly | |
| 4,388,753 A * | 6/1983 | Brookes | B21J 15/00 29/433 |
| 5,135,340 A * | 8/1992 | Stinson | F16B 19/1045 411/183 |
| 5,170,923 A * | 12/1992 | Dear | B21J 15/34 227/55 |
| 2013/0209196 A1 | 8/2013 | Brewer | |

FOREIGN PATENT DOCUMENTS

WO 2012/010858 1/2012

* cited by examiner

*Primary Examiner* — Gary Estremsky
(74) *Attorney, Agent, or Firm* — Greenblum & Bernstein, P.L.C.

(57) ABSTRACT

A blind rivet arrangement (1) is described, comprising multiple rivet bodies (3, 3a, 3b) arranged in succession on a mandrel (2), the mandrel (2) having a mandrel head (8) with an outside diameter which is greater than an inside diameter of the rivet bodies (3, 3a, 3b). The aim is to provide an inexpensive way to produce a blind rivet arrangement that works effectively. To this end the mandrel (2) and the mandrel head (8) are designed as parts that are produced separately and joined together.

21 Claims, 1 Drawing Sheet

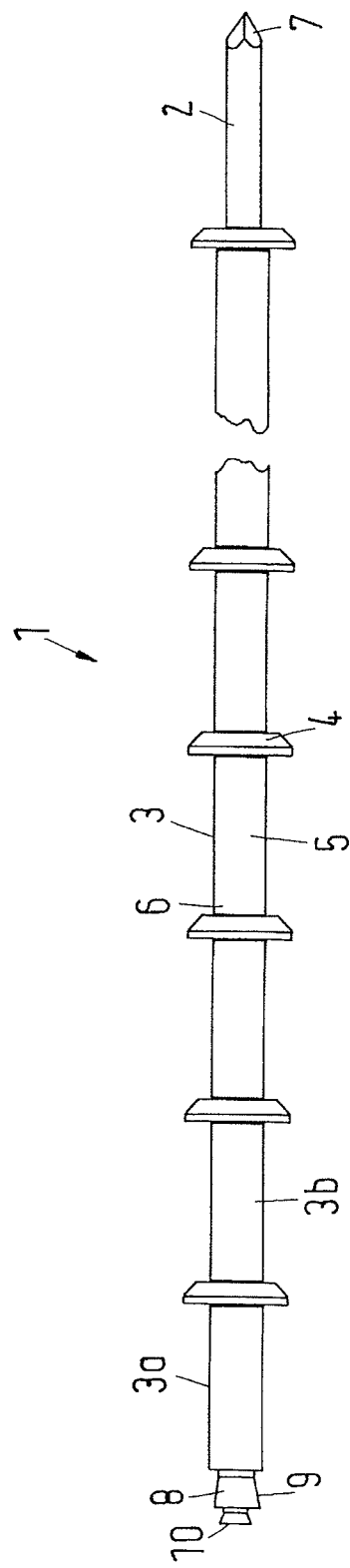

BLIND RIVET ARRANGEMENT

The invention relates to a blind rivet arrangement having multiple rivet sleeves which are arranged in succession on a rivet mandrel, wherein the rivet mandrel comprises a rivet mandrel head with an outer diameter that is larger than an inner diameter of the rivet sleeves.

A blind rivet arrangement of this type is also known as a "magazine rivet" or "pull rivet." A blind rivet arrangement of this type is used if it is desirable to set multiple blind rivets without having to load a new blind rivet into a setting device each time.

During the setting of a blind rivet of this blind rivet arrangement, the rivet sleeve adjacent to the rivet mandrel head is first inserted into the opening in which the blind rivet is to be set, namely until the set head of the rivet sleeve bears against the surrounding region of the opening. A pulling force is subsequently applied to the rivet mandrel. The rivet mandrel head then slips into the rivet sleeve and forms a closing head. Unlike other blind rivets, however, the rivet mandrel does not tear off, but rather the rivet mandrel head is completely pulled through the rivet sleeve. This has the effect that, after the setting of the rivet, the next rivet sleeve is adjacent to the rivet mandrel head and the rivet sleeve arrangement can be set in the same manner as the first rivet sleeve.

The rivet mandrel head must be capable of sufficiently deforming the rivet sleeve to form the closing head and of slipping through the rivet sleeve following the formation of the closing head. On the other hand, the rivet mandrel must have a certain length in order to be able to accommodate a sufficient number of rivet sleeves. This entails considerable production effort and, as a consequence thereof, also considerable production costs. In economizing material costs there is the risk that the rivets can no longer be set adequately and reliably.

The object of the invention is to be able to cost-effectively produce a blind rivet arrangement that can be used effectively.

This object is attained for a blind rivet arrangement of the type named at the outset in that the rivet mandrel and the rivet mandrel head are embodied as parts produced separately from one another which are connected to one another.

With this embodiment, each of the two parts, the rivet mandrel and the rivet mandrel head, can be produced with regard to the particular requirements for said part. For example, the rivet mandrel must, virtually exclusively, be able to transfer sufficient pulling forces. In contrast, the rivet mandrel head must be suitable for deforming the rivet sleeve, that is, for the formation of the closing head. If the two parts are produced separately from one another, then it is possible to take these requirements into consideration.

Preferably, the blind rivet mandrel and the rivet mandrel head are formed from different materials. The requirements can also be taken into account by the selection of material. It is thus possible, for example, to embody the rivet mandrel head such that it is harder than the rivet mandrel. Since a greater hardness is often accompanied by a greater brittleness, which would in turn lead to a risk of breakage for the rivet mandrel, the rivet mandrel head can, for example, be rendered harder than the rivet mandrel.

Preferably, the rivet mandrel is formed from a spring steel. A spring steel is strong enough on the outside to be able to enter into a connection with the rivet mandrel head. On the inside, spring steel is tough enough to transfer the desired pulling forces to the rivet sleeve via the rivet mandrel head and to deform the rivet sleeve.

Preferably, the rivet mandrel is inserted into the rivet mandrel head. This facilitates the production of a connection between the rivet mandrel and the rivet mandrel head.

Here, it is preferred that the rivet mandrel projects through the rivet mandrel head. A connection, or a part of the connection, between the rivet mandrel and the rivet mandrel head can be provided on the end protruding out of the rivet mandrel head.

Preferably, the rivet mandrel head is embodied as a ring. A ring of this type can, for example, have an annular or cylindrical outer contour. However, it can also have any other desired outer contour, for example, a polygon, in particular a tetragon, hexagon, octagon or the like. The contour of the rivet mandrel head can be freely selected within broad limits.

Preferably, the rivet mandrel and the rivet mandrel head are releasably connected to one another. It is then possible, for example, to use one rivet mandrel repeatedly with different rivet mandrel heads, or one rivet mandrel head can be used more often than the rivet mandrel. It is also possible to adjust an adjustment of the blind rivet head, and possibly also of the rivet sleeves, to the given connection task.

Preferably, the rivet mandrel and the rivet mandrel head have, at least in one pulling direction, a positive-fit connection to one another. The pulling direction corresponds to the longitudinal direction of the rivet mandrel, namely in the direction from the rivet mandrel head to the rivet sleeves. Only in this direction does the connection need to be capable of transferring pulling forces. A positive fit can, for example, be formed in that the rivet mandrel is compressed at the end protruding out of the rivet mandrel head, in order to increase its diameter.

An alternative embodiment of a positive-fit connection can provide that the rivet mandrel head is screwed onto the rivet mandrel.

Alternatively or additionally, it can be provided that the rivet mandrel head is pressed or shrink-fitted onto the rivet mandrel. In this case the rivet mandrel can also already be provided with a shaping, for example, a circumferential groove or a circumferential projection, in the region of the rivet mandrel head, so that a positive fit can also be produced in addition to the pressed connection or shrink-fitted connection.

Finally, it is also possible that the rivet mandrel head and the rivet mandrel are bonded, soldered or welded to one another, wherein in the case of welding, a friction welding connection can be produced in particular. This also makes it possible for the necessary pulling forces to be transferred from the rivet mandrel to the rivet mandrel head, in order to deform part of the rivet sleeve to create a closing head, and to allow the rivet mandrel head to subsequently slip through the rivet sleeve.

Preferably, the rivet sleeve head comprises a conical circumferential surface. The rivet mandrel head thus has at its end adjacent to the rivet sleeve a smaller outer diameter than at the opposing end. This makes it easier for the rivet mandrel head to enter into the rivet sleeve.

The invention is described below on the basis of a preferred exemplary embodiment in connection with the drawing. Wherein:

The single FIGURE shows a schematic illustration of a blind rivet arrangement.

A blind rivet arrangement 1 comprises a rivet mandrel 2, onto which multiple rivet sleeves 3 are threaded in succession. Each rivet sleeve 3 comprises a set head 4 and a shank 5. The shank 5 is essentially embodied in the shape of a hollow cylinder. The shank is not deformed at its end opposite of the set head 4. Here, a closing head will eventually be formed, as is known per se. This end of the shank 5 is therefore referred to as the closing head-side end 6.

On the rivet mandrel 2, the rivet sleeves 3 all have the same alignment, that is, a set head 4 always bears against a closing head-side end 6 of an adjacent rivet sleeve 3 (with the exception of the last rivet sleeve).

The rivet mandrel 2 comprises a pulling end 7 that protrudes out of the set head 4 of the last rivet sleeve 3 (on the right in the FIGURE). At the other end, the rivet mandrel 2 comprises a rivet mandrel head 8. As can be seen, the rivet mandrel head 8 has a conical circumferential surface 9. The rivet mandrel head 8 thus has on its end adjacent to the rivet sleeves 3 a diameter that is smaller than an inner diameter of the shank 5 of the rivet sleeves 3 and has at the other end a diameter that is larger than the inner diameter of the shank 5 of the rivet sleeves 3.

Thus, if a sufficient pulling force is applied to the pulling mandrel 2 at the pulling end 7, then the rivet mandrel head 8, which is configured in relation to each of the rivet sleeves, to slip into the first rivet sleeve 3a to form a closing head in this position. The rivet mandrel head 8 is then pulled further and completely through the first rivet sleeve 3a, so that in a set configuration the mandrel head 8 is not positioned within the hollow cylindrical shank 5 of the rivet sleeve 3a, and so that the second rivet sleeve 3b subsequently takes the place of the first rivet sleeve 3a. This is known per se.

The rivet mandrel 8 is produced separately from the rivet mandrel 2. After the production of the rivet mandrel head 8 and the rivet mandrel 2, the rivet mandrel head 8 and the rivet mandrel 2 are connected to one another. Here, the rivet mandrel 8 is embodied as a ring, into which the rivet mandrel 2 is inserted, wherein the rivet mandrel preferably projects through the rivet mandrel head 8.

The rivet mandrel 2 can be formed from a spring steel. Spring steel has the advantage that it is strong on the outside and tough enough on the inside to be able to transfer the necessary pulling forces to the rivet mandrel head 8 and to the rivet sleeves 3. However, only with certain difficulties can the steel be brought into a shape that would be desirable for the rivet mandrel head 8. With the options for separate production, this problem can be avoided in an elegant manner. The rivet mandrel head 8 can be formed from a different material than the rivet mandrel 2, so that relatively large freedom for the shaping is available here. Thus, the rivet mandrel head 8 does not necessarily need to have a round or circular outer contour, for example, but can rather also be embodied in a polygonal manner, for example.

In the present exemplary embodiment, the rivet mandrel 2 comprises at the end which projects through the rivet mandrel head 8 a thickening 10 which forms a positive fit in the pulling direction with the rivet mandrel head 8. The thickening 10 can, for example, be produced by means of a compression procedure. The thickening 10 can sufficiently transfer pulling forces from the rivet mandrel 2 to the rivet mandrel head 8 when the rivet mandrel 2 is pulled in the pulling direction, that is, to the right in the drawing. A transfer of force in the opposing direction of motion of the rivet mandrel 2 is not absolutely necessary. Therefore, the connection between the rivet mandrel head 8 and the rivet mandrel 2 can be released in this direction, so that the rivet mandrel 2 and the rivet mandrel head 8 are releasably connected to one another.

A releasable connection of this type allows a rivet mandrel 2 to be used with different rivet mandrel heads 8, so that the rivet mandrel heads 8 can be easily adapted to different rivet sleeves 3, for example, to different diameters, or to different materials of the rivet sleeves 3.

It is also possible to use a rivet mandrel head 8 more often than the rivet mandrel 2, or to use the rivet mandrel 2 more often than the rivet mandrel head 8. In this case, because the rivet mandrel 2 and the rivet mandrel 8 do not need to be disposed of together if one of the two parts has become unusable, it is also possible to reduce costs.

Another option for connecting the rivet mandrel head 8 to the rivet mandrel 2 is to screw the rivet mandrel head 8 onto the rivet mandrel 2.

It is also possible to press or shrink-fit the rivet mandrel head 8 onto the rivet mandrel 2, wherein in this case, releasing the connection between the rivet mandrel head 8 and the rivet mandrel 2 is more complicated.

It is also possible to bond, solder or weld the rivet mandrel head 8 and the rivet mandrel 2 to one another. Particularly suitable for the welded connection is a friction welding, in which the rivet mandrel 2 and the rivet mandrel head 8 are rotated relative to one another, namely such that a welding temperature is produced by the frictional heat between the rivet mandrel head 8 and the rivet mandrel 2.

The invention claimed is:

1. Blind rivet arrangement comprising:
    a rivet mandrel;
    multiple rivet sleeves arranged in succession on the rivet mandrel, each of the rivet sleeves having an inner diameter;
    the rivet mandrel comprising a rivet mandrel head having an outer diameter larger than the inner diameter of each of the rivet sleeves;
    the rivet mandrel and the rivet mandrel head being embodied as parts produced separately from one another and being connected to one another; and
    the rivet mandrel head being configured, in relation to each of the multiple rivet sleeves, to be pulled completely through each of the multiple rivet sleeves.

2. Blind rivet arrangement according to claim 1, wherein: the rivet mandrel and the rivet mandrel head are formed from different materials.

3. Blind rivet arrangement according to claim 1, wherein: the rivet mandrel is formed from spring steel.

4. Blind rivet arrangement according to claim 1, wherein: the rivet mandrel is connected to the rivet mandrel head by being inserted into the rivet mandrel head.

5. Blind rivet arrangement according to claim 4, wherein: the rivet mandrel extends through and projects beyond the rivet mandrel head.

6. Blind rivet arrangement according to claim 1, wherein: the rivet mandrel head is embodied as a ring.

7. Blind rivet arrangement according to claim 1, wherein: the rivet mandrel and the rivet mandrel head are releasably connected to one another.

8. Blind rivet arrangement according to claim 1, wherein: the rivet mandrel and the rivet mandrel head comprise, at least in a pulling direction, a positive-fit connection to one another.

9. Blind rivet arrangement according to claim 8, wherein: the rivet mandrel head is connected to the rivet mandrel by being screwed onto the rivet mandrel.

10. Blind rivet arrangement according to claim 1, wherein:
    the rivet mandrel head is connected to the rivet mandrel by being pressed or shrink-fitted onto the rivet mandrel.

11. Blind rivet arrangement according to claim 1, wherein:

the rivet mandrel head and the rivet mandrel are connected to one another by being bonded or soldered or welded to one another.

12. Blind rivet arrangement according to claim 1, wherein:
the rivet mandrel head and the rivet mandrel are connected to one another by being friction welded to one another.

13. Blind rivet arrangement according to claim 1, wherein:
rivet mandrel head comprises a conical circumferential surface.

14. Blind rivet arrangement according to claim 1, wherein:
the rivet mandrel has a pulling end and a mandrel head end; and
the rivet mandrel head is connected to the rivet mandrel such that, during setting of each of the multiple rivet sleeves, the rivet mandrel head is fixed against movement both in relation to and toward the pulling end of the rivet mandrel.

15. Blind rivet arrangement according to claim 1, wherein:
the rivet mandrel head is connected to the rivet mandrel by a connection selected from the group consisting of the following:
pressed onto the rivet mandrel;
shrink-fitted onto the rivet mandrel;
bonded onto the rivet mandrel;
soldered onto the rivet mandrel;
welded onto the rivet mandrel;
friction welded onto the rivet mandrel.

16. Blind rivet arrangement according to claim 1, wherein:
the rivet mandrel has a pulling end and a mandrel head end;
each of the multiple rivet sleeves includes a set head and a hollow cylindrical shank, the hollow cylindrical shank extending in a direction away from the mandrel head end toward the pulling end of the mandrel, from a closing-head end of the hollow cylindrical shank to the set head;
each of the multiple rivet sleeves is configured to assume, selectively, a preset configuration and a set configuration; and
in the set configuration the mandrel head is not positioned within the hollow cylindrical shank.

17. Blind rivet arrangement comprising:
a rivet mandrel formed from spring steel;
multiple rivet sleeves arranged in succession on the rivet mandrel, each of the rivet sleeves having an inner diameter;
the rivet mandrel comprising a rivet mandrel head having an outer diameter larger than the inner diameter of each of the rivet sleeves; and
the rivet mandrel and the rivet mandrel head being embodied as parts produced separately from one another and being connected to one another.

18. Blind rivet magazine arrangement comprising:
a rivet mandrel having a pulling end;
multiple rivet sleeves, each of the rivet sleeves comprising:
a set head; and
a hollow cylindrical shank extending away from the set head to a closing head-side end of the hollow cylinder shank, the hollow cylindrical shank defining an inner diameter;
the rivet mandrel comprising a rivet mandrel head having an outer diameter larger than the inner diameter of each of the rivet sleeves, the rivet mandrel head being positioned at an end of the rivet mandrel opposite the pulling end of the rivet mandrel;
the rivet mandrel extending through the hollow cylindrical shank of each of the multiple rivet sleeves, with the pulling end of the rivet mandrel protruding from the set head of a last of the multiple rivet sleeves farthest from the rivet mandrel head, the multiple rivet sleeves being arranged in succession on the rivet mandrel with the set head of each of the multiple rivet sleeves being closer to the pulling end of the rivet mandrel than to the rivet mandrel head;
the rivet mandrel and the rivet mandrel head being embodied as parts produced separately from one another and being connected to one another; and
the rivet mandrel head being configured, in relation to each of the multiple rivet sleeves, to be pulled completely through the hollow cylindrical shank of each of the multiple rivet sleeves in succession as each of the multiple rivet sleeves is set, in a direction from the closing head-side end of the hollow cylinder shank to the set head end of the hollow cylinder shank.

19. Blind rivet magazine arrangement according to claim 18, wherein:
the rivet mandrel is made of spring steel.

20. Blind rivet magazine arrangement according to claim 19, wherein:
the rivet mandrel and the rivet mandrel head are formed from different materials.

21. Blind rivet magazine arrangement according to claim 18, wherein:
the rivet mandrel head comprises a conical circumferential surface.

* * * * *